Feb. 22, 1938.   R. R. SEARLES   2,109,053
BEARING
Filed Aug. 24, 1936

INVENTOR
RAYMOND R. SEARLES
BY
*Mitchell Bechert*
ATTORNEYS

Patented Feb. 22, 1938

2,109,053

UNITED STATES PATENT OFFICE 2,109,053

BEARING

Raymond R. Searles, New Britain, Conn., assignor to The Fafnir Bearing Company, New Britain, Conn., a corporation of Connecticut Application August 24, 1936, Serial No. 97,484

8 Claims. (Cl. 308—184)

My invention relates to a bearing and more particularly to a supporting means for a bearing to deaden or dissipate bearing noises.

It is an object of the invention to provide an improved form of bearing mounting for deadening or dissipating bearing noises.

Another object is to provide a bearing mounting of sound deadening material, together with means for securing the same to a support and means for preventing injury to the bearing support by said securing means.

A further object is to provide an improved form of sound deadening bearing support which is cheap to manufacture and simple in construction.

A further object is to provide a sound deadening resilient bearing support, together with seal means held in place by the resiliency of said bearing mounting.

Other objects and various features of invention will be hereinafter pointed out or will become apparent to those skilled in the art.

In the drawing which shows, for illustrative purposes only, a preferred form of the invention—

In said drawing, 5 indicates a support which may be a metallic part of a machine frame. The bearing support in the preferred form shown comprises a block 6 of sound deadening and preferably resilient material such as rubber. The block is of generally rectangular form and relatively narrow. Centrally of the block is a circular bore or bearing recess 7, in the form shown extending entirely through the block and being of substantially uniform diameter throughout. The base of the block is preferably flat so as to fit on the support 5 and is held thereon by means of bolts. The block is provided with bolt holes extending from near the top thereof through the bottom for the reception of bolts 8—8. In the form shown the bolt holes are provided with tubes or bushings 9—9, which may be cast integrally with the block or forced into holes cast in the block. These bushings 9—9 are preferably of slightly less length than the thickness of the rubber mounting through which they pass so that when the nuts are drawn up tight, the rubber will be sufficiently compressed to assure proper rigidity and yet because of the bushings 9—9 a mechanic will be unable to compress the rubber to a sufficient extent to materially injure its liveness, life and sound deadening properties.

Figure 1:
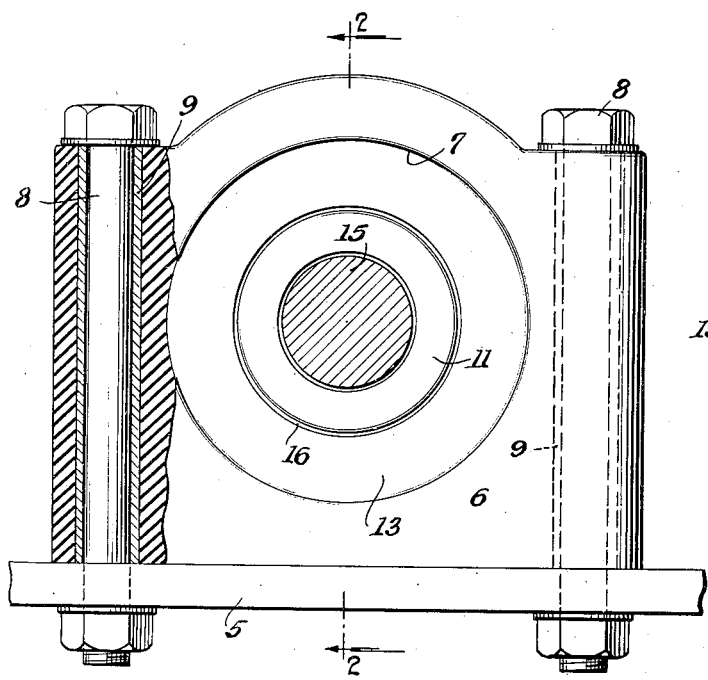
Fig. 1 is an axial view of a bearing and its support, a part of the bearing support being broken away.
Figure 2:
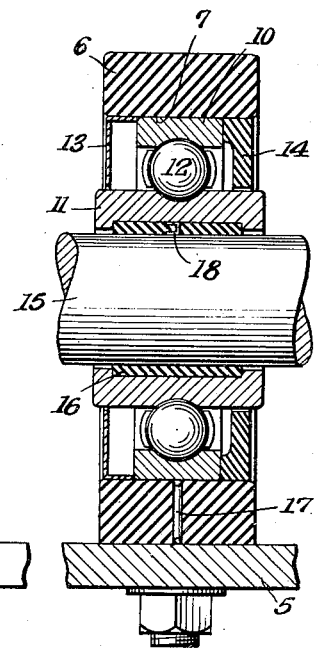
Fig. 2 is a sectional view taken substantially in the plane of the line 2—2 of Fig. 1.

The bearing comprises an outer ring 10, and inner ring 11 with interposed anti-friction bearing members 12. The outer ring 10 fits within the bore and is preferably held therein by the inherent resiliency of the rubber mounting; that is to say, the bearing is slightly oversize and is forced into the bore and when so forced in will be quite securely held by the contraction of the bore. The inner ring 11 is preferably substantially wider than the outer ring and may extend out beyond at least one side edge of the mounting. Seal means may be secured in the bore at opposite sides of the bearing and be held therein by the inherent resiliency of the block 6. In the form illustrated I employ a flat, cup-shaped seal 13, the circular flange of which fits within the bore 7 and is securely held therein. The bottom of the cup is apertured for the passage of the end of the inner ring and substantially covers and seals the space between the inner and outer rings. At the opposite side I provide a seal 14 substantially closing the space between the two rings and held in the bore 7 by the resiliency of the material. The seal 14 is preferably of sound deadening material and serves to exclude foreign matter. If made of suitable sound deadening material, such as very stiff felt, raw hide or the like, it may also serve to retain lubricant in the bearing and the seals will serve to shield the rubber from the bearing grease. The long inner ring provides a good bearing on the shaft and if desired a shaft 15 may be sound insulated from the inner ring as by means of an annular wide ring 16, which may be interengaged with the bore of the inner ring as by fitting in a wide groove therein, as illustrated in Fig. 2. The shaft is preferably slightly oversize and expands the rubber ring 16 so that the contracting rubber securely locates the bearing on the shaft.

In order to prevent the accumulation of an undesirable charge of static on the shaft 15 or parts carried thereby, the bearing may be grounded, for example, as shown in Fig. 2. The block 6 may have an aperture therein carrying a ground wire 17 and engageable with a metallic base 5 and the outer ring. When the inner ring 11 is insulated from the shaft I preferably also ground the shaft and inner ring as by means of a wire or strip 18 extending between those two parts and preferably pierced through or folded over the edge of the rubber ring 16.

It will be seen that I have provided a very cheap form of bearing mounting, that is to say, there are no complicated parts to be molded. The bearing is not subject to injury in application to a support by reason of the safety bushings 9—9 and the bearing parts may be properly sealed.

While the invention has been described in considerable detail and a preferred form illustrated, it is to be understood that various changes and modifications may be made within the scope of the invention as defined in the appended claims.

I claim:

1. In a device of the character indicated, a block of insulating material having a transversely extending bore therethrough, said block having a pair of generally tangentially extending bolt holes extending therethrough and spaced from said bore, tubes in said bolt holes and bolts extending through said tubes for securing said block to a support, an anti-friction bearing comprising outer and inner bearing rings with interposed anti-friction bearing members mounted in said bore, said outer ring being a tight fit in said bore and held therein by the resiliency of said block, a body of sound deadening material in the bore of said inner ring, and seal means held in the bore through said block by the inherent resiliency of said block, for the purpose described.

2. In a device of the character indicated, a block of sound deadening resilient material having a circular recess therein, said block having a plurality of holes therein for the reception of bolts to secure said block to a support, an anti-friction bearing mounted in said recess and comprising outer and inner bearing rings with interposed anti-friction bearing members, said outer ring being a tight fit in said bearing recess and being held therein by the resiliency of said block, and seal means fitting within the bearing recess and held therein by the resiliency of said block.

3. In a device of the character indicated, a block of resilient rubber having a bearing recess therein, a bearing in said recess and comprising outer and inner bearing rings with interposed anti-friction bearing members, said outer ring being mounted in said bearing recess, a seal means of sound deadening material in said recess and extending across the space between said bearing rings, said block of rubber having bolt holes therein for receiving bolts to secure the same to a support.

4. In a device of the character indicated, a block of sound deadening resilient material having a bearing recess therein, an anti-friction bearing mounted in said recess and comprising outer and inner bearing rings with interposed anti-friction bearing members, said outer ring fitting within said recess, said inner ring being of substantially greater length than said outer ring, seal means fitting within said bearing recess and held therein by the resiliency of said block and extending across the space between said outer and inner bearing rings, and means extending transversely of said bearing recess for securing said block to a support.

5. In a device of the character indicated, a block of generally rectangular flat form mounted edgewise on a support, a bearing recess extending transversely of said block, a bearing mounted in said recess, said block at opposite sides of said bearing recess and spaced therefrom having bolt holes extending longitudinally thereof and being of a length substantially greater than the diameter of said bearing recess, and bolts extending through said bolt holes for securing said block to a support.

6. In a device of the character indicated, a block of sound deadening material having a transversely extending bearing recess therein, a bearing mounted in said recess, said block at opposite sides of said recess having bolt holes of a length greater than the diameter of said bearing recess and bolts in said bolt holes for securing said block to a support.

7. In a device of the character indicated, a block of sound deadening material having a transversely extending bearing recess therein of substantially uniform diameter throughout, bolt holes extending through said block from the bottom to near the top thereof, bolts in said bolt holes for securing said block to a support, an anti-friction bearing mounted in said bearing recess and comprising inner and outer bearing rings with interposed anti-friction bearing members, and seal means mounted in said bearing recess and held therein by the resiliency of said block and extending across the space between said inner and outer bearing rings.

8. In a device of the character indicated, a block of sound deadening material to be mounted on a support and having a transversely extending bearing recess therein, a bearing mounted in said recess, said block having securing means comprising bolt holes extending from near the top thereof through the body thereof, and bolts in said bolt holes for securing said block to a support, and means for grounding said bearing.

RAYMOND R. SEARLES.